(12) United States Patent
Ichinose et al.

(10) Patent No.: US 7,728,451 B2
(45) Date of Patent: Jun. 1, 2010

(54) WIND POWER GENERATION SYSTEM

(75) Inventors: Masaya Ichinose, Hitachiota (JP);
Shinya Oohara, Hitachi (JP); Motoo Futami, Hitachiota (JP); Mitsugu Matsutake, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/954,453

(22) Filed: Dec. 12, 2007

(65) Prior Publication Data
US 2008/0143111 A1 Jun. 19, 2008

(30) Foreign Application Priority Data
Dec. 14, 2006 (JP) .............................. 2006-336503

(51) Int. Cl.
*F03D 9/00* (2006.01)
*H02P 9/04* (2006.01)

(52) U.S. Cl. .......................................... 290/44; 290/55

(58) Field of Classification Search ................... 290/55, 290/44; 415/4.2, 4.1, 2.1, 4.5, 7; 60/398; 416/7, 132 B
See application file for complete search history.

(56) References Cited

U.S. PATENT DOCUMENTS

| | | | |
|---|---|---|---|
| 4,321,663 A | 3/1982 | Krtek | |
| 6,294,903 B1 * | 9/2001 | Yamashita et al. | 323/282 |
| 7,295,449 B2 * | 11/2007 | Berghegger | 363/19 |
| 7,348,690 B2 * | 3/2008 | Muldoon | 307/326 |
| 2003/0067793 A1 * | 4/2003 | Shimazaki et al. | 363/97 |
| 2004/0075278 A1 * | 4/2004 | Canini et al. | 290/44 |
| 2005/0200337 A1 * | 9/2005 | Schreiber et al. | 323/205 |
| 2007/0097717 A1 * | 5/2007 | Hsu et al. | 363/53 |
| 2008/0069693 A1 * | 3/2008 | Malakhova et al. | 416/61 |

OTHER PUBLICATIONS

U.S. Appl. No. 11/769,753, filed Jun. 28, 2007, M. Ichinose, et al.
U.S. Appl. No. 11/751,742, filed May 22, 2007, M. Ichinose, et al.

* cited by examiner

*Primary Examiner*—Julio Gonzalez
(74) *Attorney, Agent, or Firm*—Antonelli, Terry, Stout & Kraus, LLP.

(57) ABSTRACT

A wind power generation system includes: a wind turbine in which at least one blade is mounted on an axis; a generator for generating multiphase alternating current power by rotation of the axis; and a multiphase power conversion device for performing PWM-control for adjustment and output of generated power of the generator. With the configuration, the PWM-control provides for each phase a control paused period in which no overlap occurs. Thus, the pulse density between the control period and the control paused period of other phases is low, thereby generating high and low density in an inter-phase pulse.

4 Claims, 12 Drawing Sheets

PWM WAVEFORM

FIG.9B

OUTPUT U-PHASE PULSE WAVEFORM (CARRIER 3 KHZ, MODULATION RATE 0.8)

FIG.9C

FOURIER ANALYSIS RESULT OF INTER-PHASE VOLTAGE PULSE
(CARRIER 3 KHZ, DEAD TIME 0 $\mu$S, MODULATION RATE 0.8)

FIG.9D

FOURIER ANALYSIS RESULT OF INTER-PHASE VOLTAGE PULSE
(CARRIER 3 KHZ, DEAD TIME 5 $\mu$s, MODULATION RATE 0.8)

WIND POWER GENERATION SYSTEM

CROSS-REFERENCE TO RELATED APPLICATION

The present application relates to subject matters described in a co-pending patent application Ser. No. 11/769,753 filed on Jun. 28, 2007 entitled "VARIABLE SPEED WIND POWER GENERATION SYSTEM" and Ser. No. 11/751,742 filed on May 22, 2007 entitled "WIND POWER GENERATION APPARATUS, WIND POWER GENERATION SYSTEM AND POWER SYSTEM CONTROL APPARATUS" both by Masaya Ichinose, et al. and assigned to the assignees of the present application. The disclosures of these co-pending applications are incorporated herein by reference.

BACKGROUND OF THE INVENTION

The present invention relates to a wind power generation system provided with a generator and a multi-phase power conversion device for PWM control.

A wind power generation system is provided with a blade that converts wind power energy into rotational energy, a generator for acquiring electric power from the rotational energy transmitted to a rotor, and a power conversion device for outputting the acquired power to a power system, and supplies electric power to a load at home and in a factory connected to the power system. The document "Process of Pulse Duration Modulation of a Multi-phase Converter" (which corresponds to U.S. Pat. No. 4,321,663 to Krtek), discloses the technology of adding an equal amount of compensation to each voltage command for use in multi-phase pulse width modulation, thereby shortening a switching period.

SUMMARY OF THE INVENTION

To efficiently convert wind power energy into electric power, it is important to efficiently operate a generator and a power conversion device. Especially, there is the problem of a switching loss with an IGBT (insulated gate bipolar transistor) etc. for use in a power conversion device.

Although the above-mentioned technology is applied to a power conversion device, the low-order harmonic current of an alternating current output by a power converter increases due to the on-delay time (dead time) of the on-off pulse set for protection against a short-circuit by a switching device. In a power converter which outputs generated power in cooperation with a power system, it is necessary to reduce the harmonic component of an electric current. In addition, there is a problem of an iron loss and a copper loss by the presence of the harmonic component.

Thus, the present invention aims at providing a wind power generation system capable of reducing the loss for the power conversion device.

To solve the above-mentioned problems, the wind power generation system according to the present invention includes a wind turbine provided with at least one blade mounted on an axis, a generator for generating a multi-phase alternating current by the rotation of the axis, and a power conversion device for performing PWM control in order to adjust and output the generated power of the generator. In the wind power generation system, the PWM control has a control paused period for each phase that does not overlap another period in one cycle.

With the system, since a control paused period is set for each phase in the PWM control, the switching loss for the power conversion device is reduced, thereby realizing a highly efficient wind power generation system. At this time, the control paused period for one phase overlaps the control period for another phase, and the pulse density of the inter-phase voltage is low. Also, the control period for one phase overlaps the control period for another phase, and the pulse density of the inter-phase voltage is low. Therefore, a changing pulse density features the PWM pulse waveform control. Specifically, when a wound-rotor induction generator is used, the frequency of the excitation current applied to one coil is controlled, thereby matching the generation frequency with the system frequency of the power system connected to another coil. It is desired to use the PWM system for changing the pulse density when the frequency (basic frequency) of the AC voltage output by the power converter is high in order to avoid the heat of the switching element in the control paused period.

The present invention can reduce the loss of the power conversion device.

Other objects, features and advantages of the invention will become apparent from the following description of the embodiments of the invention taken in conjunction with the accompanying drawings.

DESCRIPTION OF THE EMBODIMENTS

First Embodiment

The configuration of the wind power generation system according to the first embodiment of the present invention is described below with reference to the attached drawings.

Figure 1:
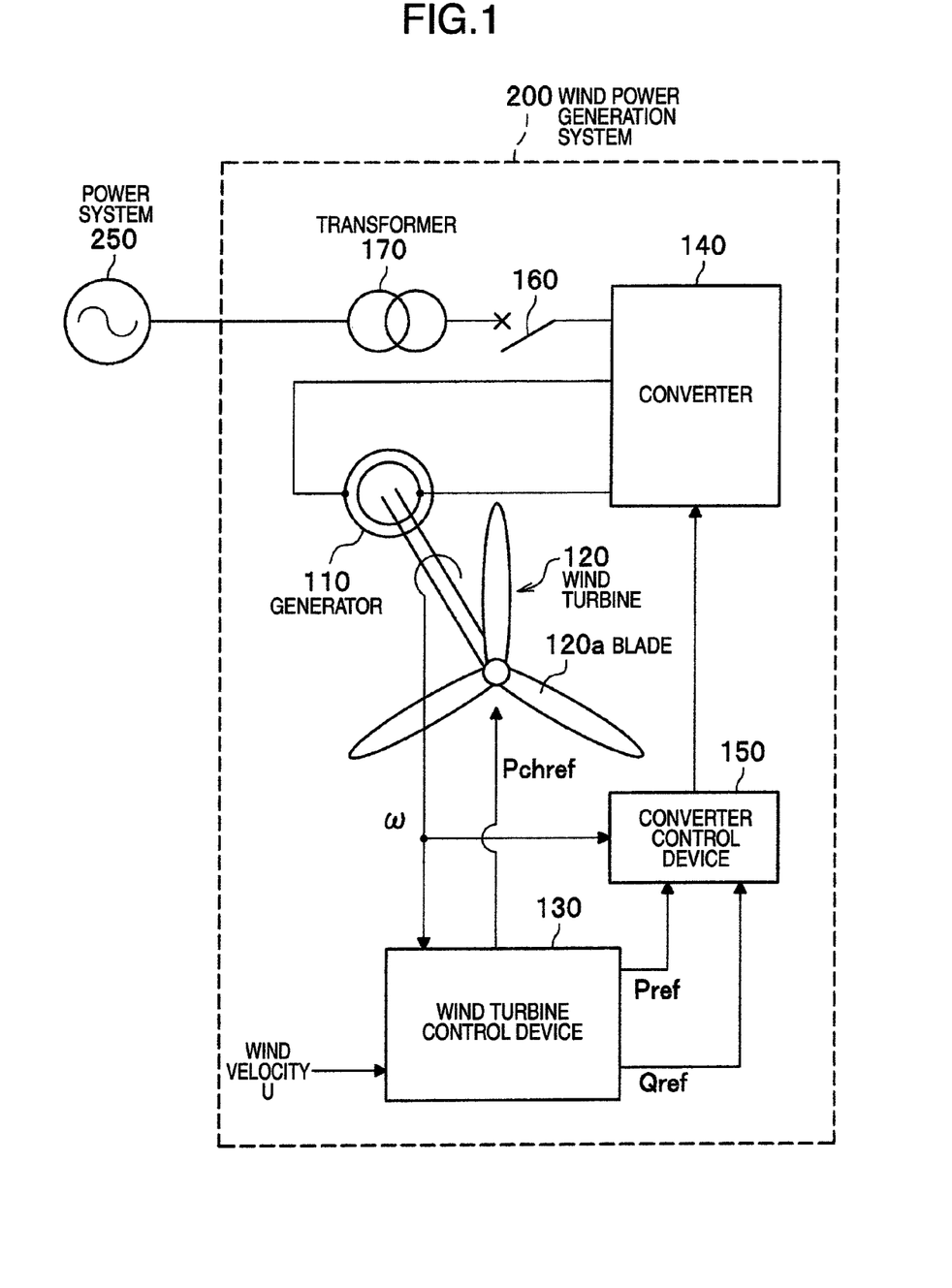
FIG. 1 shows the entire configuration of the wind power generation system and the power system according to an embodiment of the present invention.

In FIG. 1, a wind power generation system 200 is connected to a power system 250, and is provided with a converter (excitation device) 140 as a power conversion device, a generator 110, a wind turbine 120, a wind turbine control device 130, a converter control device 150, a transformer 170, and a breaker 160. The power system 250 can be regarded simply as a power supply when it has a large capacity, and transmits power to user home, a factory, etc. through power lines not shown in the attached drawings.

The wind turbine 120 is provided with three blades 120a, and is mechanically connected to a rotor of the generator 110, and the generator 110 is electrically connected to the converter 140. As necessary, the wind turbine 120 is connected to a rotor through a gear. The breaker 160 has the function of electrically disconnecting the wind power generation system 200 from the power system 250.

The wind turbine control device 130 inputs the values of the wind velocity U and the rotation speed $\omega$ of the generator 110, outputs a pitch angle command Pchref to the blade 120a, controls a blade angle, performs an arithmetic operation on an active power command Pref, and transmits the active power command Pref and a reactive power command Qref to the converter control device 150.

The converter control device 150 PWM-controls the converter 140 at each command, and adjusts and controls the power directly output by the generator 110 to the power system 250, and the power (active power, reactive power) generated by the generator 110 and output to the power system 250 through a capacitor Cd (FIG. 2) in the converter 140. The wind turbine control device 130 controls the pitch angle command Pchref and the converter control device 150 controls the frequency of the excitation current of the generator 110, and matches the generation frequency with the system frequency.

Figure 2:
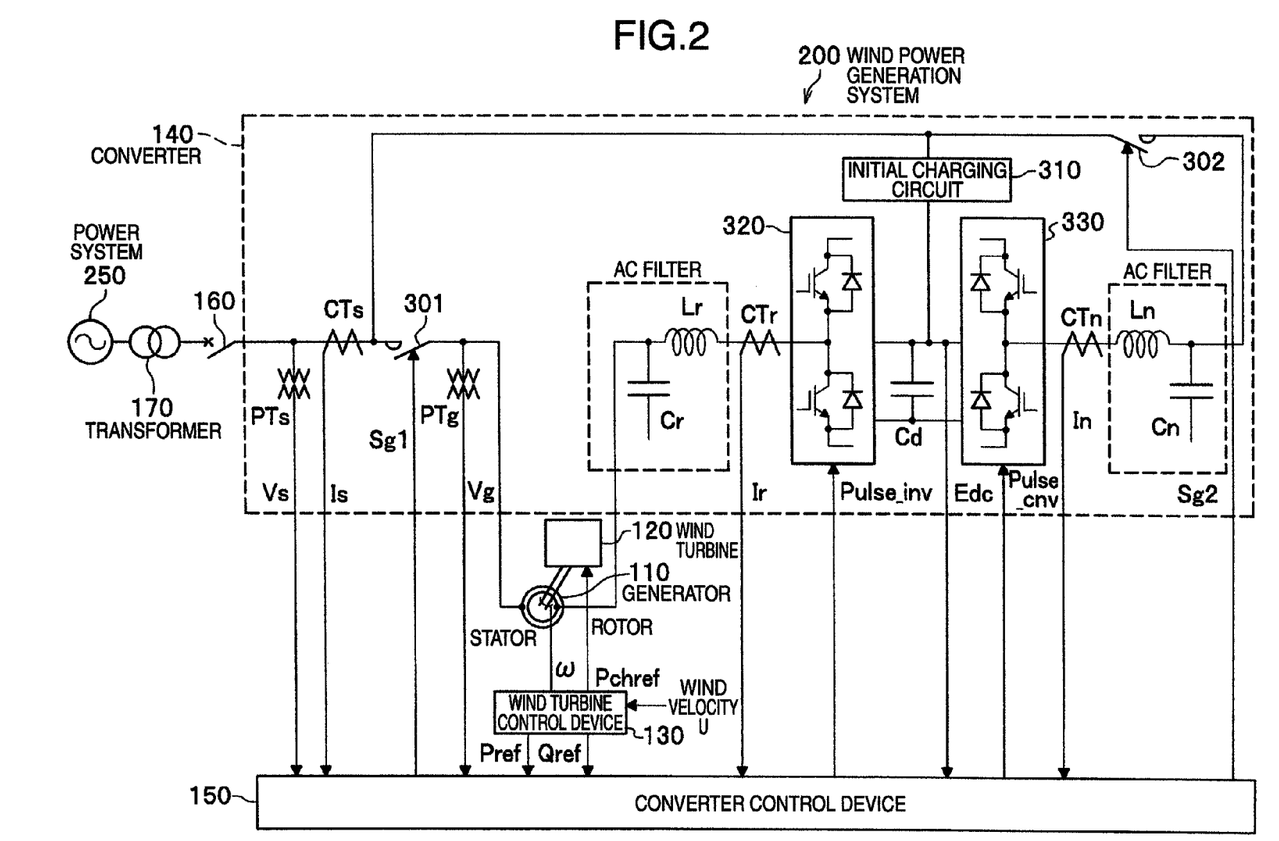
FIG. 2 shows the detailed configuration of the wind power generation system according to an embodiment of the present invention.

Next, the wind power generation system 200 is described below in detail with reference to FIG. 2. FIG. 2 has the configuration using a wound-rotor induction generator as the generator 110. As described above, the wind power generation system 200 includes the converter 140, the generator 110, the wind turbine 120, the wind turbine control device 130, and the converter control device 150, and the converter 140 and the power system 250 are connected to each other through the breaker 160.

The converter 140 includes: two converters 320 and 330 capable of bidirectionally converting an alternating current and a direct current; a capacitor Cd, provided between the converters 320 and 330, for charging DC power; an initial charging circuit 310 for initially charging the capacitor Cd; capacitors Cr and Cn and reactors Lr and Ln; electromagnetic contactors 301 and 302, voltage sensors PTs and PTg; current sensors CTr, CTn, and CTs. The capacitor Cd can be used with any of a capacitor, a chargeable battery, and a supercapacitor.

The electromagnetic contactor 301 can be opened and closed according to an operation signal Sg1. One end of the contactor is connected to one end of the electromagnetic contactor 302 and the external breaker 160, and the other end is connected to the coil on the stator side of the generator 110. The other end of the electromagnetic contactor 302 is connected to the converter 330 as a second power converter through the AC filter configured by the capacitor Cn and the reactor Ln.

The direct current side of the converter 330 and the direct current side of the converter 320 are connected to the capacitor Cd, and the output of the alternating current of the converter 320 as a first power converter is connected to the rotor coil of the generator 110 through the AC filter configured by the reactor Lr and the capacitor Cr. The AC filter has the function of converting the PWM-modulated switching waveform into an alternating current waveform to pass an excitation current to the rotor coil.

The converter 320 provided on the generator 110 side and the converter 330 provided on the power system 250 side with respect to the capacitor Cd convert AC power to DC power, have a bi-directional conversion function of converting AC power into DC power, and DC power into AC power, and are configured using IGBT elements as semiconductor switching elements. Not only the IGBT elements, but also thyristors, GTOs, MOS-FETs, etc. can be applied.

The AC filter mounted on the alternating current output terminal of the converter 330 on the power system side and configured by the reactor Ln and the capacitor Cn has the function of attenuating a harmonic current and a harmonic voltage, and converts a PWM-controlled switching waveform into an alternating current waveform.

The rotor of the generator 110 is coupled with the axis of the wind turbine 120, and rotates by the wind power received by the wind turbine 120. It is also possible to increase the rotation speed using a gear etc. for connection between the rotor and the wind turbine 120. A speed detector configured by, for example, an encoder is connected to the rotor, and the speed detector outputs the value of the rotation speed $\omega$ to the converter control device 150 and the wind turbine control device 130. The wind turbine 120 is configured to change the angle of the blade 120a (blade angle) at a pitch angle command Pchref. When the incident direction of wind is defined as 0°, the area of receiving wind increases by a larger blade angle.

Described next are the wiring and the devices for controlling generated power. The three-phase system voltage Vs and system current Is of the breaker 160 are respectively converted into a low voltage voltage detection signal and current detection signal by the voltage sensor PTs and the current sensor CTs. These signals are input to the converter control device 150.

The voltage on the secondary side of the electromagnetic contactor 301 (between the electromagnetic contactor 301 and the stator of the generator 110) is detected by the voltage sensor PTg, and the signal of the detected stator voltage Vg is input to the converter control device 150.

The DC voltage Edc of the capacitor Cd connected to the direct current circuits of the converter 320 and the converter 330 is input to the converter control device 150 as a direct current voltage signal by the voltage sensor. The initial charging circuit 310 for charging using the system voltage of the electromagnetic contactor 301 is connected to the capacitor Cd.

A generator current Ir on the alternating current side of the converter 320 is detected by the current sensor CTr, and a converter output current In on the alternating current side of the converter 330 is detected by the current sensor CTn, and the detected generator current Ir and the converter output current In are input to the converter control device 150.

The wind turbine control device 130 inputs the wind velocity U and the rotation speed $\omega$, calculates the active power command Pref and the reactive power command Qref, transmits each command to the converter control device 150, calculates the pitch angle command Pchref to indicate the angle (pitch angle) of the blade 120a, and transmits the command to the wind turbine 120.

The converter control device 150 controls the electromagnetic contactors 301 and 302 according to the operation signal Sg1 and the external signal Sg2 respectively. The converter control device 150 outputs the pulse signals Pulse_inv and Pulse_cnv for respectively drive-controlling the converters 320 and 330 configured by semiconductor switching elements.

Opening and closing the electromagnetic contactor 302 are specified by the external signal Sg2. When the electromagnetic contactor 302 is turned on, the converter 330 starts its operation by the pulse signal Pulse_cnv, and controls the DC voltage Edc of the capacitor Cd for a constant value.

Figure 3:
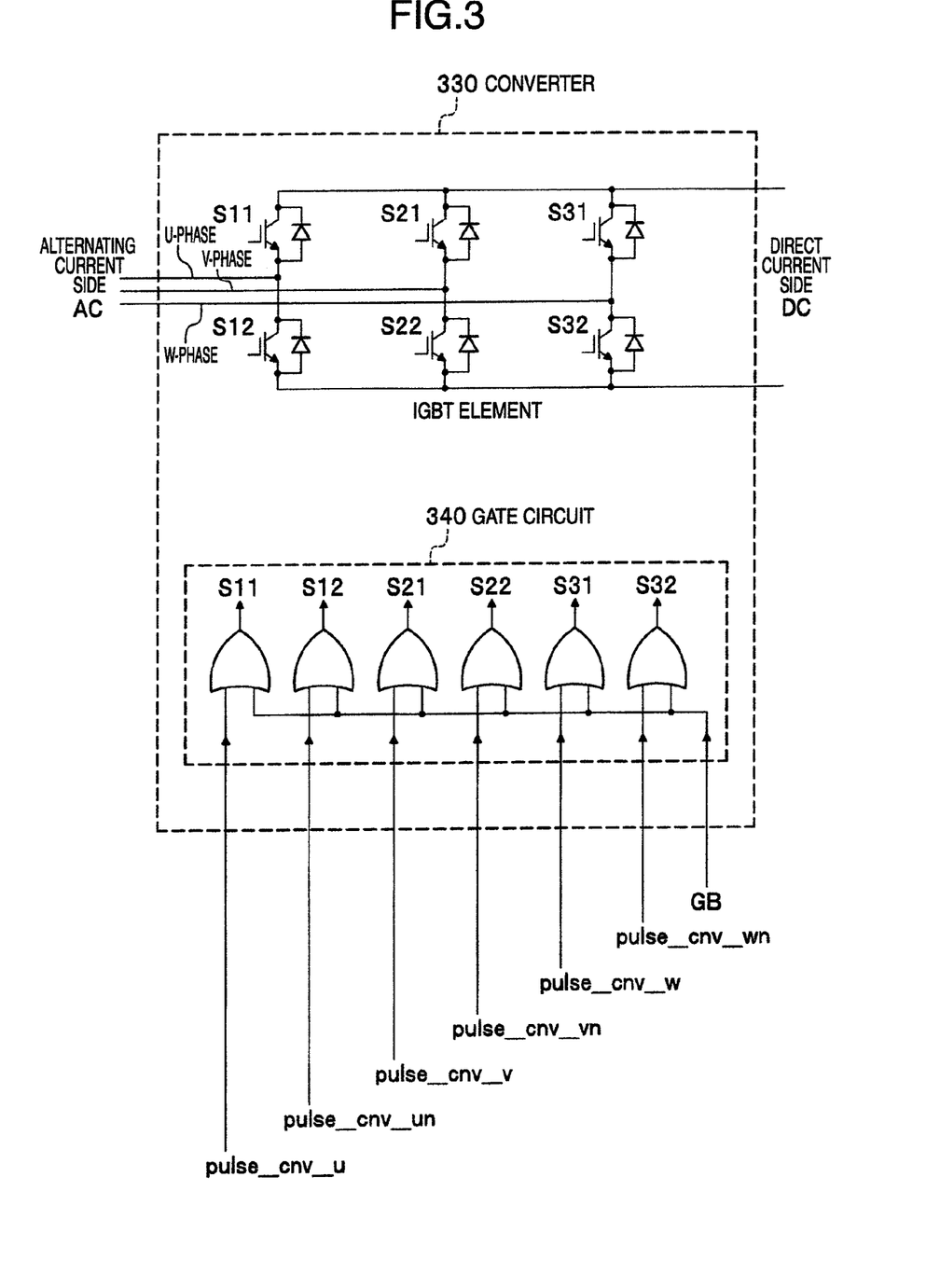
FIG. 3 is a schematic circuit diagram of the converter.

FIG. 3 is a schematic circuit diagram of the converter 330. (The converter 320 has a similar circuit). The converter 330 is provided with 6 IGBT elements (S11 to S32). The upper elements S11, S21, and S31 and the lower elements S12, S22, S32 are serially connected. Each IGBT element is ON-OFF controlled by inputting the pulse signal Pulse_cnv to a gate. For example, the converter control device 150 sets a pulse signal Pulse_cnv_u to "1" when the U-phase IGBT element S11 is turned on, and sets the pulse signal Pulse_cnv_u to "0" when the element is turned off. A clamp diode is added to each IGBT element.

At this time, the pulse signal Pulse_cnv_un to be input to the gate of the IGBT element S12 as an U-phase lower element is generated using the inverted signal ("0" for "1", and "1" for "0") of a gate signal Pulse_cnv_u of the IGBT element S11 as an upper element. In this case, since if the IGBT elements S11 and S12 are simultaneously turned on, the direct current side is short-circuited. Therefore, the timing of turning on the elements are delayed to set a period in which both the IGBT element S11 and the IGBT element S12 are turned off (dead time). In addition, since all IGBT elements are turned off during a pause or an emergency, a gate circuit 340 is provided, and a gate block signal GB is input to the OR gate with a pulse signal. Since the operations in the V-phase and W-phase are similar, the explanation is omitted here.

The functions of the converter control device 150 are described below with reference to FIGS. 2, 4, and 5. The functions shown in FIGS. 4 and 5 are realized by the CPU, ROM, RAM, and a program.

First, the control of the converter 330 is described below in detail. In the detailed configuration shown in FIG. 2, the direct current voltage is charged by the initial charging circuit 310 before the converter 330 starts its operation, the electromagnetic contactor 302 is turned on according to the external signal Sg2, and the converter 330 is connected to the power system 250.

Figure 4:
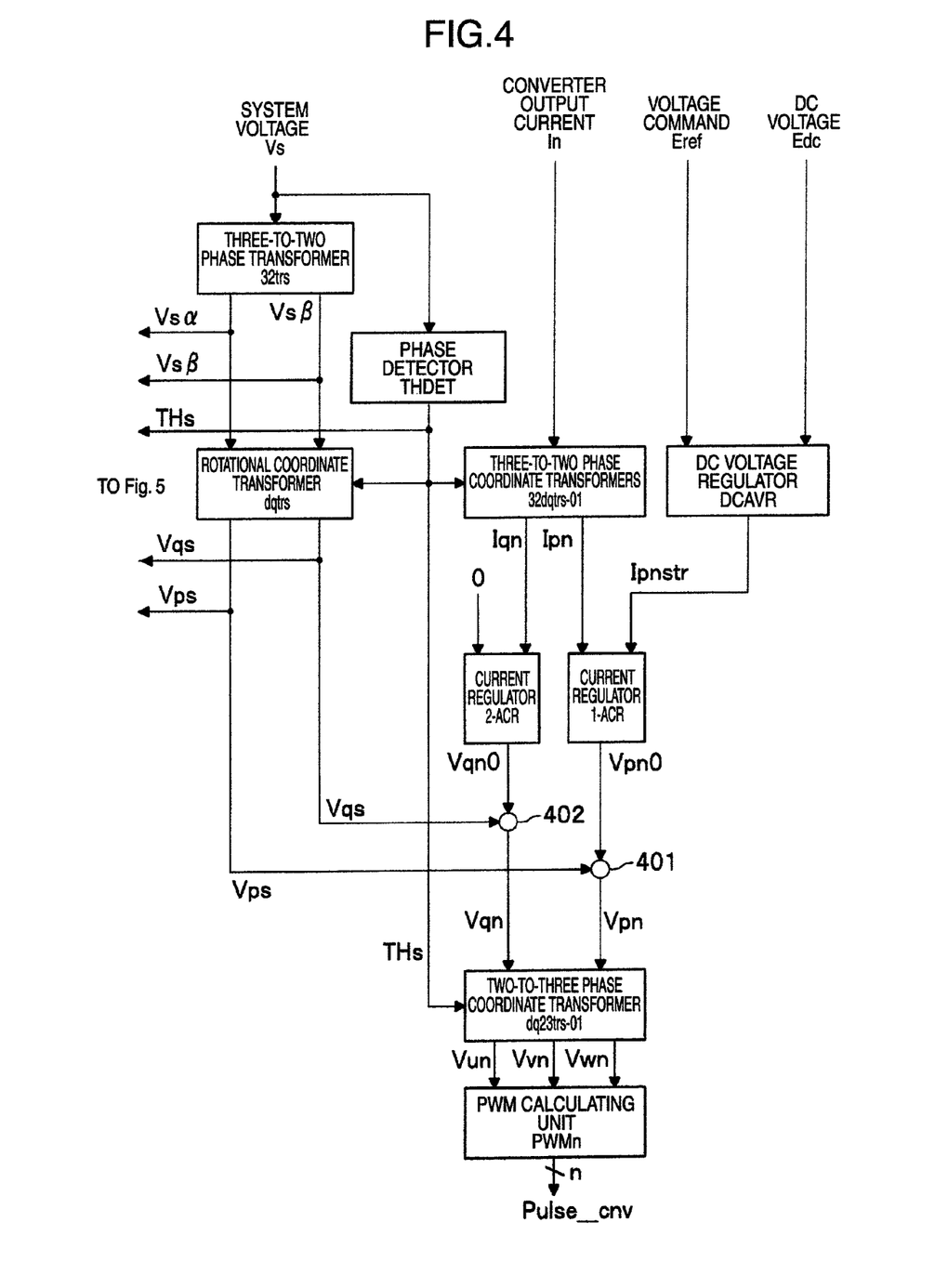
FIG. 4 shows a part of the internal configuration of the converter control device.
Figure 5:
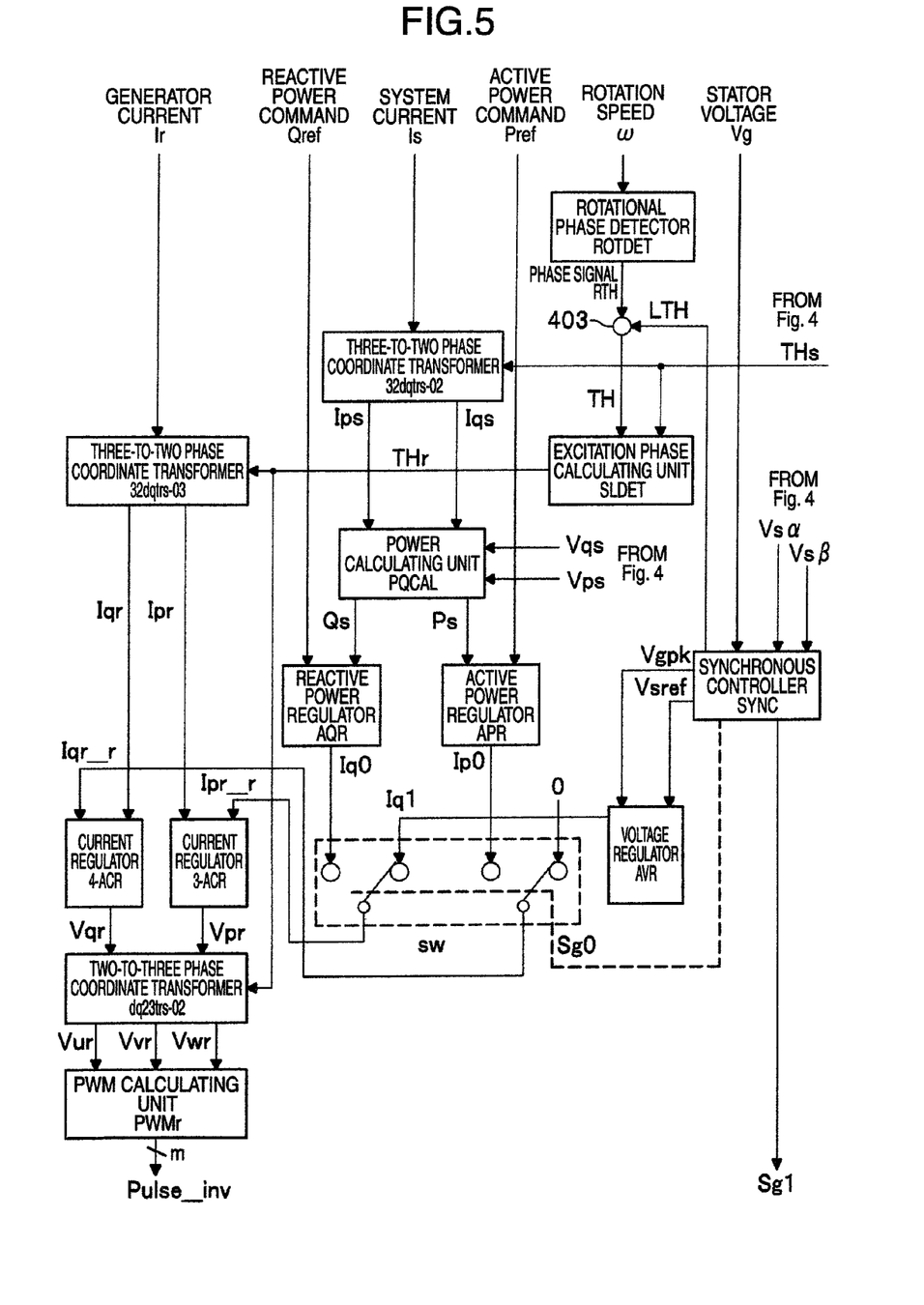
FIG. 5 shows another part of the internal configuration of the converter control device.

In FIG. 4, detection value of the voltage detection signal Vs is input to a phase detector THDET and a three-to-two phase transformer 32trs. The phase detector THDET calculates a phase signal THs following the voltage of the power system 250 (FIG. 2) in, for example, the phase lock loop (PLL: Phase_Locked_Loop) method, and then outputs the phase signal THs (phase signal when the system U-phase voltage is a sine wave) to three-to-two phase coordinate transformer 32dqtrs-01, a rotational coordinate transformer dqtrs, and the two-to-three phase coordinate transformer dq23trs-01, and to the three-to-two phase coordinate transformer 32dqtrs-02 shown in FIG. 5 and an excitation phase calculating unit SLDET.

Back in FIG. 4, the voltage command Eref and the DC voltage Edc are input to a DC voltage regulator DCAVR (for example, configured by a proportional integral controller PI). The DC voltage regulator DCAVR regulates a p-axis current command (active current command) Ipnstr of output so that the deviation of the DC voltage detection value Edc from the input DC voltage command Eref becomes zero, and then outputs the command to a current regulator 1-ACR.

The three-to-two phase coordinate transformers 32dqtrs-01 calculates, from the detection value of the converter output current In, a p-axis current detection value Ipn (active current) and a q-axis current detection value Iqn (reactive current) using conversion equations shown as the following equations (1) and (2), and then outputs the p-axis current detection value Ipn and the q-axis current detection value Iqn to the current regulator 1-ACR and the current regulator 2-ACR respectively.

Subscripts u, v, and w denote respective phases. For example, the U-phase current of the converter output current In is denoted as Inu. This also applies to voltages etc. hereafter.

$$\begin{pmatrix} In\alpha \\ In\beta \end{pmatrix} = \frac{2}{3} \begin{pmatrix} \cos(0)\cos(2\pi/3)\cos(4\pi/3) \\ \sin(0)\sin(2\pi/3)\sin(4\pi/3) \end{pmatrix} \begin{pmatrix} Inu \\ Inv \\ Inw \end{pmatrix} \quad (1)$$

$$\begin{pmatrix} Ipn \\ Iqn \end{pmatrix} = \begin{pmatrix} \cos(THs) & -\sin(THs) \\ \sin(THs) & \cos(THs) \end{pmatrix} \begin{pmatrix} In\alpha \\ In\beta \end{pmatrix} \quad (2)$$

The current regulator 1-ACR regulates a p-axis voltage command value Vpn0 which is to be output so that the deviation of the p-axis current detection value Ipn from the p-axis current command value Ipnstr becomes zero, and then outputs the p-axis voltage command value Vpn0 to an adder 401. Similarly, the current regulator 2-ACR regulates a q-axis voltage command value Vqn0 which is to be output so that the deviation of the q-axis current detection value Iqn from the q-axis current command value (=0) becomes zero, and then outputs the q-axis voltage command value Vqn0 to the adder 402. The current regulators 1-ACR and 2-ACR can be configured with, for example, a proportional-integral controller PI.

The three-to-two phase transformer 32trs calculates an α-component Vsα and a β-component Vsβ of a momentary voltage vector from the value of an input system voltage Vs using a conversion equation shown as equation (3). The rotational coordinate transformer dqtrs calculates a p-axis voltage detection value (phase component matching a system voltage vector) Vps and a q-axis voltage detection value Vqs (component orthogonal to the p-axis voltage detection value Vps) by an equation (4), and outputs the values to the adders 401 and 402 respectively.

$$\begin{pmatrix} Vs\alpha \\ Vs\beta \end{pmatrix} = \frac{2}{3} \begin{pmatrix} \cos(0)\cos(2\pi/3)\cos(4\pi/3) \\ \sin(0)\sin(2\pi/3)\sin(4\pi/3) \end{pmatrix} \begin{pmatrix} Vsu \\ Vsv \\ Vsw \end{pmatrix} \quad (3)$$

$$\begin{pmatrix} Vps \\ Vqs \end{pmatrix} = \begin{pmatrix} \cos(THs) & -\sin(THs) \\ \sin(THs) & \cos(THs) \end{pmatrix} \begin{pmatrix} Vs\alpha \\ Vs\beta \end{pmatrix} \quad (4)$$

The adder 401 outputs the sum Vpn of the p-axis voltage command value Vpn0 and the p-axis voltage detection value Vps to the two-to-three phase coordinate transformer dq23trs-01. Similarly, the adder 402 adds the q-axis voltage command value Vqn0 and the q-axis voltage detection value Vqs and then outputs the result to the two-to-three phase coordinate transformer dq23trs-01.

The two-to-three phase coordinate transformer dq23trs-01 inputs the phase signal THs and the sum Vpn and Vqn of the adders, calculates voltage command values Vun, Vvn, and Vwn using conversion equations shown as the following equations (5) and (6), and outputs the results to a PWM calculating unit PWMn.

$$\begin{pmatrix} Va \\ Vb \end{pmatrix} = \begin{pmatrix} \cos(THs) & \sin(THs) \\ -\sin(THs) & \cos(THs) \end{pmatrix} \begin{pmatrix} Vpn \\ Vqn \end{pmatrix} \quad (5)$$

$$\begin{pmatrix} Vun \\ Vvn \\ Vwn \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (6)$$

The PWM calculating unit PWMn uses a pulse width modulation system, calculates a gate signal Pulse_cnv for turning on/off n semiconductor elements constituting the converter 330 from the input voltage commands Vun, Vvn, and Vwn, and outputs the result to the converter 330.

Described below is the converter 320.

In FIG. 5, the value of the rotation speed ω of the generator 110 (FIG. 2) is input to the rotational phase detector ROTDET. The rotational phase detector ROTDET converts the rotation speed ω into a phase, and outputs the phase signal RTH to an adder 403.

The phase signal LTH as the output of a synchronous controller SYNC is added to the phase signal RTH by the adder 403, output as a new phase signal TH, and the phase signal TH is input to the excitation phase calculating unit SLDET with the phase signal THs (FIG. 4).

The excitation phase calculating unit SLDET subtracts the phase signal TH from the phase signal THs, multiplies the result by the polar logarithm k of the generator, thereby calculating the phase signal THr (=k (THs−TH)) of an electrical angular frequency of the rotator of the generator 110, and outputs the result to the three-to-two phase coordinate transformer 32dqtrs-03 and the two-to-three phase coordinate transformer dq23trs-02.

The power calculating unit PQCAL inputs the p-axis current Ips (in the same direction as the U-phase vector of the system voltage Vs) output by the three-to-two phase coordinate transformer 32dqtrs-02, and the q-axis current Iqs orthogonal to the U-phase vector of the system voltage. Then, the active power Ps and the reactive power Qs are calculated by the equations (7) and (8).

$$Ps = 3(Vps \times Ips + Vqs \times Iqs)/2 \quad (7)$$

$$Qs = 3(-Vps \times Iqs + Vqs \times Ips)/2 \quad (8)$$

The active power regulator APR inputs the converted value of the active power Ps and the active power command Pref of the wind power generation system 200, and outputs the active current command Ip0 so that the deviation of the active power command Pref and the active power Ps from the converted value can be zero. The reactive power regulator AQR inputs the converted value of the reactive power Qs and the power command Qref, and outputs the excitation current command Iq0 of the output so that the deviation between the power command Qref and the reactive power Qs can be zero. The power regulators APR and AQR are configured by, for example, a proportional integrator.

The current command Ip0 output by the active power regulator APR and the current command Iq0 output by the reactive power regulator AQR are input to the switch SW.

The switch SW determines whether the output Ip0 and Iq0 of the active power regulator APR and the reactive power regulator AQR are used, or zero is used for the active current command, and the output Iq1 of the voltage regulator AVR is used for an excitation current command, and outputs the determined command value as a command signal Ipr_r of the current regulator 3-ACR, or as a command signal Iqr_r of the current regulator 4-ACR. The switch SW uses the latter setting (zero for the active current command, and the output Iq1 of the voltage regulator for the excitation current command) before the electromagnetic contactor 301 (FIG. 2) is powered up (that is, in the voltage synchronous operation to synchronize the stator voltage Vg detected as the stator voltage of the generator 110 (FIG. 2) with the system voltage Vs), and selects the former setting (output Ip0 and Iq0 of each power regulator) after the electromagnetic contactor 301 is powered up.

The synchronous controller SYNC calculates the amplitude command Vsref obtained using a filter on the α component Vsα and β component Vs of the momentary voltage vector of the system voltage Vs (FIGS. 2 and 4), and similarly calculates from the stator voltage Vg the stator voltage amplitude value Vgpk obtained using a filter on the momentary voltage vector. The synchronous controller SYNC has the functions of determining whether or not the amplitude command Vsref is synchronized with the stator voltage amplitude value Vgpk of the generator 110, outputting the phase signal LTH for correction when the phases are different between the system voltage Vs (FIGS. 2 and 4) and the stator voltage Vg, and determining whether or not the phases of the system voltage Vs and the stator voltage Vg enter a predetermined range and is synchronized with each other, and outputting the operation signal Sg1 of the electromagnetic contactor 301 (FIG. 2) and the control switch signal Sg0 indicated by broken lines.

The voltage regulator AVR is described below. The voltage regulator AVR inputs the stator voltage amplitude value Vgpk of the stator voltage Vg as a feedback value, and the amplitude command Vsref obtained by passing the amplitude value of the system voltage Vs through a filter as a command, thereby outputting to the switch SW the excitation current command Iq1, which is set such that the deviation of the stator voltage Vg from the amplitude command Vsref can be zero. The voltage regulator AVR is configured by, for example, a proportional integral controller. The voltage regulator AVR operates 301 in an open state, and adjusts the excitation current command Iqr_r to be passed from the converter 320 to the rotor side of the generator 110 in order to match the amplitude value of the system voltage Vs with the amplitude value of the stator voltage Vg of the generator 110.

Thus, by the synchronous controller SYNC operating the voltage regulator AVR and the switch SW, the stator voltage Vg can be synchronized with the system voltage Vs including the phase before the generator 110 is connected to the power system 250 (FIG. 2), and can be immediately switched to control the power after the generator is connected to the power system 250. That is, the frequency of the stator voltage Vg can match with the system frequency by changing the frequency of the excitation current of the rotor although the rotation speed ω of the wind turbine 120 is low.

Described below is the configuration of controlling the current of the rotor at a current command. The three-to-two phase coordinate transformer 32dqtrs-03 calculates the q-axis current detection value Iqr (excitation current component) and the p-axis current detection value Ipr (active current component) by the conversion equations (9) and (10) from the input generator current Ir and the signal THr of the rotor, thereby outputting the q-axis current detection value Iqr to the current regulator 4-ACR and the p-axis current detection value Ipr to the current regulator 3-ACR.

$$\begin{pmatrix} Ir\alpha \\ Ir\beta \end{pmatrix} = \frac{2}{3} \begin{pmatrix} \cos(0)\cos(2\pi/3)\cos(4\pi/3) \\ \sin(0)\sin(2\pi/3)\sin(4\pi/3) \end{pmatrix} \begin{pmatrix} Iru \\ Irv \\ Irw \end{pmatrix} \quad (9)$$

$$\begin{pmatrix} Ipr \\ Iqr \end{pmatrix} = \begin{pmatrix} \cos(THr) & -\sin(THr) \\ \sin(THr) & \cos(THr) \end{pmatrix} \begin{pmatrix} Ir\alpha \\ Ir\beta \end{pmatrix} \quad (10)$$

The current regulator 4-ACR adjusts the q-axis voltage command Vqr of the output such that the deviation of the q-axis current detection value Iqr from the q-axis current command Iq1 or Iq0 can be set to zero. Similarly, the current regulator 3-ACR adjusts the q-axis voltage command Vqr of the output such that the deviation of the p-axis current detection value Ipr from the p-axis current command Ip1 (=0) or Ip0 can be set to zero. The current regulators 3-ACR and 4-ACT can be configured by, for example, a proportional integrator.

The p-axis voltage command value Vpr and q-axis voltage detection value Vqr are input to a two-to-three phase coordinate transformer dq23*trs*-02. The two-to-three phase coordinate transformer dq23*trs*-02 calculates voltage command value Vur, Vvr, and Vwr from the phase signal THr and each input value described above, based on the following conversion equations (11) and (12), and then outputs the voltage command values to the PWM calculating unit PWMr.

$$\begin{pmatrix} Va \\ Vb \end{pmatrix} = \begin{pmatrix} \sin(THr) & \cos(THr) \\ -\cos(THr) & \sin(THr) \end{pmatrix} \begin{pmatrix} Vdr \\ Vqr \end{pmatrix} \quad (11)$$

$$\begin{pmatrix} Vur \\ Vvr \\ Vwr \end{pmatrix} = \begin{pmatrix} \cos(0) & \sin(0) \\ \cos(2\pi/3) & \sin(2\pi/3) \\ \cos(4\pi/3) & \sin(4\pi/3) \end{pmatrix} \begin{pmatrix} Va \\ Vb \end{pmatrix} \quad (12)$$

The PWM calculating unit PWMr calculates the m-phase pulse signal Pulse_inv for turning on or off the IGBT element (FIG. 2) configuring the converter 320 by the pulse width modulation system from the input voltage commands Vur, Vvr, and Vwr, and outputs the signal to the converter 320.

The PWM calculating unit PWMn is described below with reference to FIGS. 6A and 6B. The amplitude of the triangular wave of the PWM calculating unit is set in the range ±1. The voltage commands Vun, Vvn, Vwr are transformed into the voltage commands VunP, VvnP, and VwnP for generating a pulse by the equations (13) and (14) below. FIG. 6 shows only the pulse signal Pulse_inv_u generated by comparing the U-phase voltage command VunP with a triangular wave.

When Abs (Max (Vun, Vvn, Vwn))≦Abs (Min (Vun, Vvn, Vwn)), the equation (13) holds.

$$\begin{pmatrix} VunP \\ VvnP \\ VwnP \end{pmatrix} = \begin{pmatrix} Vun \\ Vvn \\ Vwn \end{pmatrix} \begin{pmatrix} A \\ A \\ A \end{pmatrix} \quad (13)$$

where A=1−Max (Vun, Vvn, Vwn)

When Abs(Max (Vun, Vvn, Vwn))>Abs(Min (Vun, Vvn, Vwn)), the equation (14) holds.

$$\begin{pmatrix} VunP \\ VvnP \\ VwnP \end{pmatrix} = \begin{pmatrix} Vun \\ Vvn \\ Vwn \end{pmatrix} \begin{pmatrix} B \\ B \\ B \end{pmatrix} \quad (14)$$

where B=−1−Min(Vun, Vvn, Vwn)

The inter-phase voltage of a voltage command for generating a pulse is obtained by (VunP−VvnP)=(Vun+A)−(Vvn+A)=Vun−Vvn, and matches the inter-phase voltage of the voltage command. That is, the inter-phase voltage is unchanged when an optional value of A is added to a phase voltage.

Figure 6A:
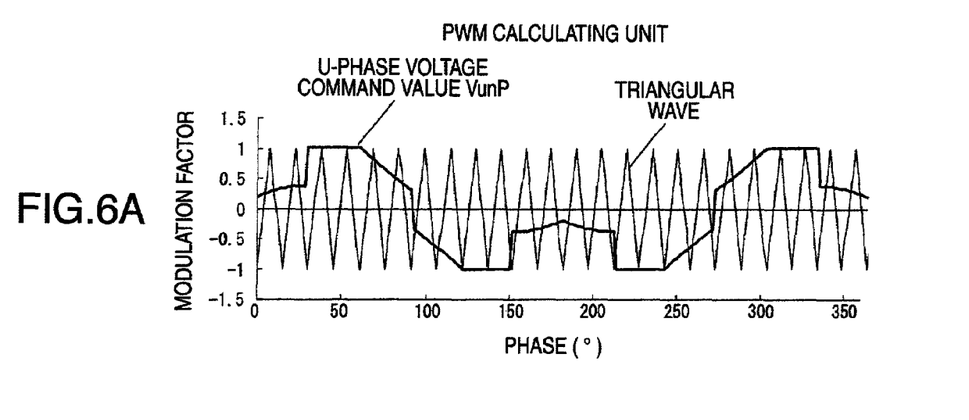
FIGS. 6A and 6B are explanatory views of the PWM arithmetic operation system.
Figure 6B:
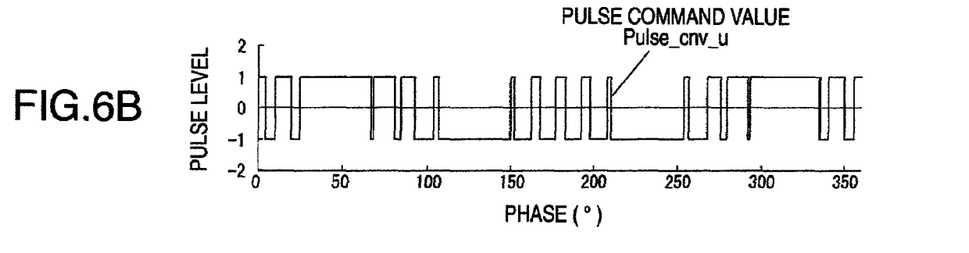

As shown in FIGS. 6A and 6B, when the U-phase voltage command VunP equals or exceeds the value of a triangular wave (FIG. 6A), the pulse signal Pulse_conv_u for turning on or off an IGBT element remains in the ON state (FIG. 6B). On the other hand, then a U-phase voltage command equals or falls below the value of a triangular wave, the pulse signal Pulse_conv_u remains in the OFF state.

Thus, by comparing the voltage commands VunP, VvnP, and VwnP of each phase with the value of a triangular wave, the pulse signals Pulse_cnv_u, Pulse_cnv_v, and Pulse_cnv_w for operating the IGBT element (FIG. 2) of the converter 330 is generated from the comparison result.

The operation of the converter 330 with the above-mentioned configuration is briefly described below. In FIG. 2, the converter control device 150 detects the phase of the system voltage Vs, and controls the current command in phase with the detected voltage phase, thereby transmitting and receiving active power between the bi-directional converter 330 and the power system 250, and controlling the DC voltage Edc. If the DC voltage Ed etc. drops by the converter 320 on the generator side using the power of the capacitor Cd, then the converter 330 on the power system 250 side charges the capacitor Cd using the AC power, and operates such that the DC voltage Edc can maintain a constant value. On the other hand, when the DC voltage Edc rises by the converter 320 charging the DC power, the converter 330 converts the DC power into the AC power to discharge the capacitor Cd, thereby maintaining constant value of the DC voltage Edc.

Figure 7:
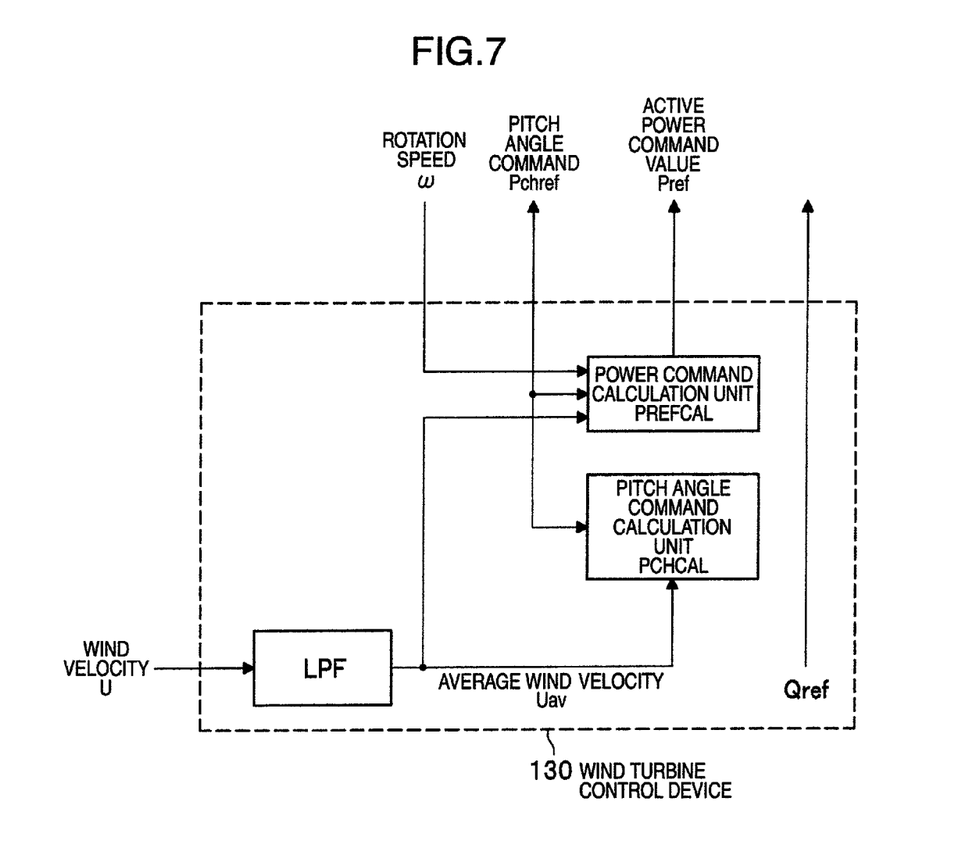
FIG. 7 shows the internal configuration of the wind turbine control device.

Next, using the internal configuration shown in FIG. 7, the internal configuration of the wind turbine control device 130 is briefly described below. In FIG. 7, the wind turbine control device 130 inputs the value of wind velocity U, and calculates an average value of the wind velocity U, that is, the average wind velocity Uav, using a first delay filter LPF. The calculated average wind velocity Uav is input to a pitch angle command calculation unit PCHCAL and a power command calculation unit PREFCAL.

The pitch angle command calculation unit PCHCAL calculates the pitch angle command Pchref using, for example, the average wind velocity Uav and a pitch angle table. The pitch angle command Pchref is transmitted to the wind turbine 120 and the power command calculation unit PREFCAL. The power command calculation unit PREFCAL outputs the active power command Pref from a target amount of generation and a target value of rotation speed (peripheral speed ratio) obtained from the average wind velocity Uav. Thus, the converter control device 150 (FIG. 2) PWM-controls the converter 320, and controls the rotation speed ω of the rotor for a predetermined value. The wind turbine control device 130 (FIG. 2) generates a reactive power command value Qref.

Figure 8A:
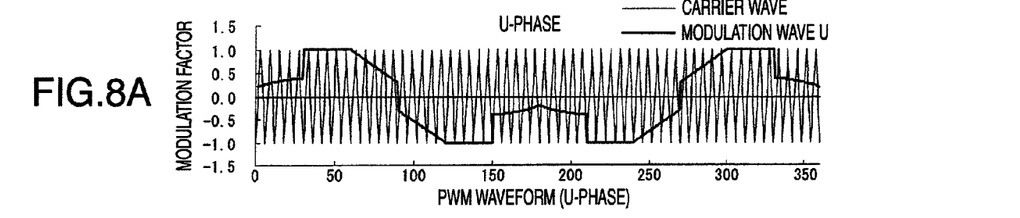
FIGS. 8A to 8E show output waveforms of the PWM-controlled converter.
Figure 8B:
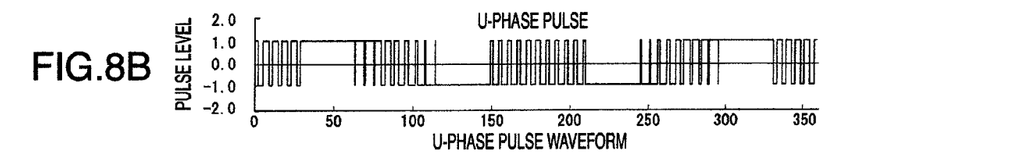
Figure 8C:
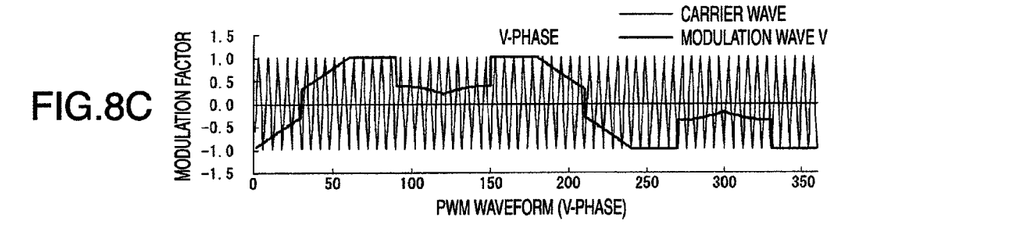
Figure 8D:
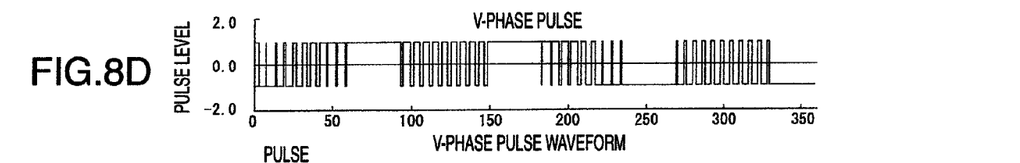
Figure 8E:
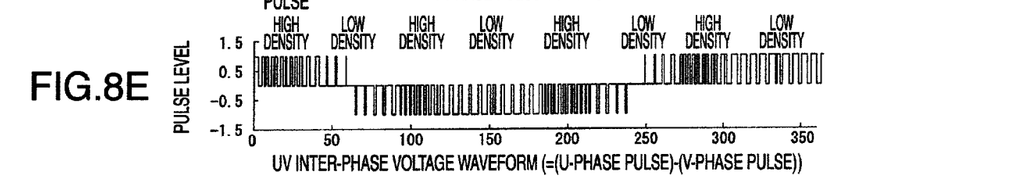

FIGS. 8A to 8E show the pulse waveforms of the inter-phase voltages generated by the PWM calculating unit PWMn. FIG. 8A shows the voltage command for the U-phase PWM (modulation wave generated by the equations (13) and (14)) and the triangular wave (carrier wave). The vertical axis indicates a modulation level and the horizontal axis indicates the phase (°). FIG. 8B is generated from FIG. 8A, and shows the U-phase pulse waveform for turning on/off the IGBT element. The vertical axis indicates the pulse level. FIGS. 8C and 8D show the PWM waveform and pulse waveform with respect to the V phase. FIG. 8E shows the inter-phase voltage waveform of the converters 320 and 330 generated from the U-phase and V-phase pulse waveforms. Since the U-phase and the V-phase have different periods in which pulses are paused, the inter-phase voltage waveform indicates high and low pulse density, and there are four high and low levels in density in one period. The longitudinal wave is filtered using an AC filter of the Ln and Cn (FIG. 2), thereby providing power for the power system 250, or filtered using an AC filter of the LrCr, thereby exciting the rotor of the generator 110.

Since each phase has a period in which a pulse is paused, the switching loss by the ON/OFF of the IGBT element is reduced. However, if the frequency of the voltage command is reduced, the ON time in one period is long, and the heat of the semiconductor is concentrated partially. Therefore, when the frequency is lower than a value predetermined depending on the heat, the PWM system of the present invention is not appropriate.

In addition, as shown in the attached drawings, since there are six large change points of modulation wave in a period, it is desired that the carrier frequency (triangular wave frequency) of a triangular wave is a multiple of 6 to prevent a phase shift.

Thus, for the power converter of the wind power generation system 200, a low loss power converter can be realized by using the PWM modulation system shown by the equations (13) and (14) in the converter 330 connected to the power system side where no large frequency change is detected.

When the PWM modulation system by the equations (13) and (14) is used for the converter 320 on the generator side, a low loss converter 320 on the generator side can be realized by using the system only when the rotation speed of the generator 110 (in the range of the electrical angular frequency is substantially close to the system frequency) is high. (That is, in the low speed range, the normal pulse width modulation system is used, and the PWM modulation system by the equations (13) and (14) is used in the high speed range.) The current distortion can be reduced by setting the carrier frequency in this case as an integral multiple of 6.

As described above, according to the present embodiment, when the frequency (fundamental frequency) of an AC voltage output by the converter 330 is high in the power conversion device of the wind power generation system 200, the PWM modulation system in which the density of the inter-phase voltage pulse changes is used to realize a low loss power conversion device. Thus, the wind power generation system 200 can reduce in shape the coils Ln and Lr, and the capacitors Cn and Cr. In addition, the wind power generation system 200 can reduce the current distortion by setting the carrier frequency (frequency of a triangular wave) in this case as an integral multiple of 6. Furthermore, the harmonic can be reduced by adding a different value for compensation of a dead time to the three-phase voltage commands Vun, Vvn, Vwn.

Second Embodiment

Next, the second embodiment is described below with reference to FIGS. 9A to 9D, FIG. 10 and FIG. 11. The present embodiment is different from the first embodiment in generating the voltage commands Vun, Vvn, Vwn. The similar functions to those in the first embodiment are assigned the same reference numerals, and the explanation is omitted here.

As described above with reference to FIG. 3, the pulse for issuing an ON/OFF command input to the upper element and the lower element of the IGBT element configuring the power conversion device according to the pulse signal generated by the PWM calculating unit inputs Pulse_cnv_u, Pulse_cnv_v, and Pulse_cnv_w to the upper element, and the inverted pulses Pulse_cnv_un, Pulse_cnv_vn, and Pulse_cnv_wn to the lower element. The subscript n of the pulse signal indicates an inverse signal, that is, the ON/OFF pulse of the lower element.

In the pulse signal of the same phase, when the upper pulse and the lower pulse are simultaneously at high levels, the DC voltage is short circuited and the IGBT element is destroyed by an overcurrent. Therefore, to prevent the upper pulse and the lower pulse from simultaneously entering a high level, an on-delay signal is applied to the pulse signal to provide a period in which both pulses can be in the OFF state (dead time). At the dead time, a harmonic increases due to a generated voltage distortion.

Figure 9A:
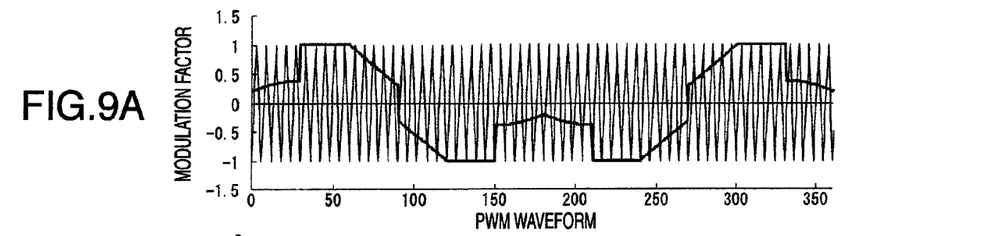
FIGS. 9A to 9D are explanatory views of the low order harmonic set by dead time.
Figure 9B:
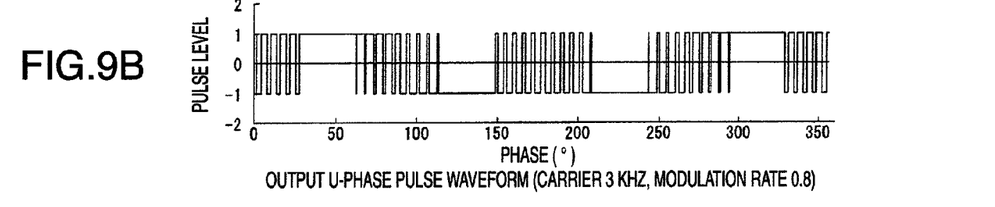
Figure 9C:
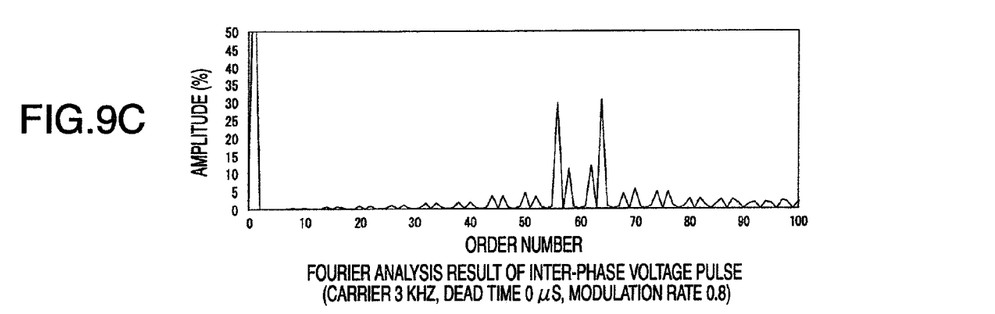
Figure 9D:
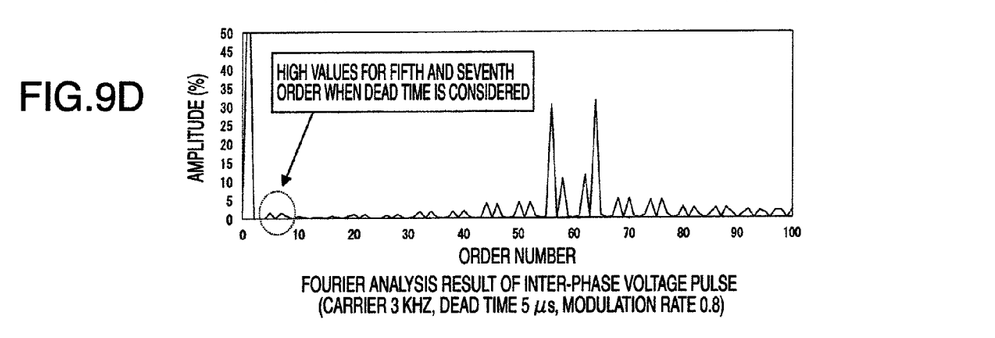

FIG. 9A shows a PWM modulation wave and a triangular wave, and FIG. 9B shows a PWM pulse waveform as in FIGS. 8A and 8B. FIG. 9C shows a Fourier analysis result of the inter-phase voltage pulse when no dead time is applied. FIG. 9D shows a Fourier analysis result of the inter-phase voltage pulse when a dead time of 5 µs is set. The vertical axes shown in FIGS. 9C and 9D indicate the amplitude "%", and the horizontal axes indicate the order number of a harmonic. In FIGS. 9A, 9C, and 9D, the carrier frequency of a triangular wave is 3 kHz, and the modulation rate is 0.8. By comparing FIG. 9C with FIG. 9D, it is known that the low order (fifth, seventh) voltage harmonic increases by setting a dead time.

Figure 10:
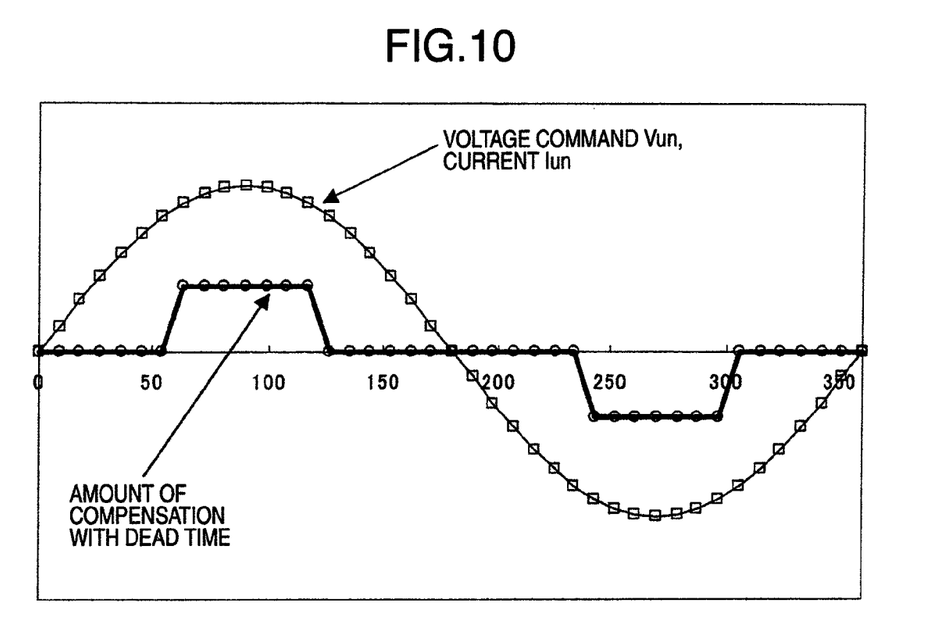
FIG. 10 is an explanatory view of the operation about the dead time compensation.

By setting a dead time, a voltage pulse having a narrower width than the voltage pulse to be output is output, thereby reducing the average voltage. Therefore, the amount of compensation of a dead time as shown in FIG. 10 is added to the PWM modulation wave. Thus, the harmonic at a low order (fifth, seventh) is reduced. The phase of the amount of compensation shown in FIG. 10 indicates the matching power factor 1, that is, the phases match between the voltage command (modulation wave) Vun and the current Inu. On the other hand, when the power factor (phase difference between a voltage and a current) changes, the voltage distortion by a dead time can be constantly minimized by changing the amount of compensation by following the phase of the current Inu. In this example, the U phase is described, but the amount of compensation of a dead time depending on each of the current Inv and Inw is added in each phase.

Figure 11:
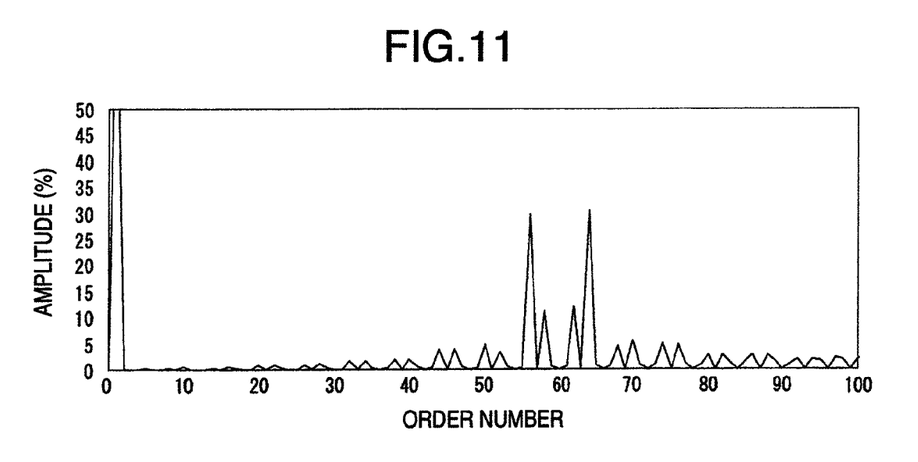
FIG. 11 shows a harmonic analysis result when the dead time compensation is applied.

FIG. 11 shows a Fourier analysis result of an inter-phase voltage pulse when the compensation of a dead time is used. As compared with FIG. 9D, the amplitude of the fifth and seventh harmonics is reduced. Thus, by compensating for a dead time, a current distortion can be decreased.

Third Embodiment

Although a wound-rotor induction generator (secondary excitation generator) is used for the 110 in each of the embodiments described above, a permanent magnetic generator (other synchronous generators are acceptable) can also be used.

Figure 12:
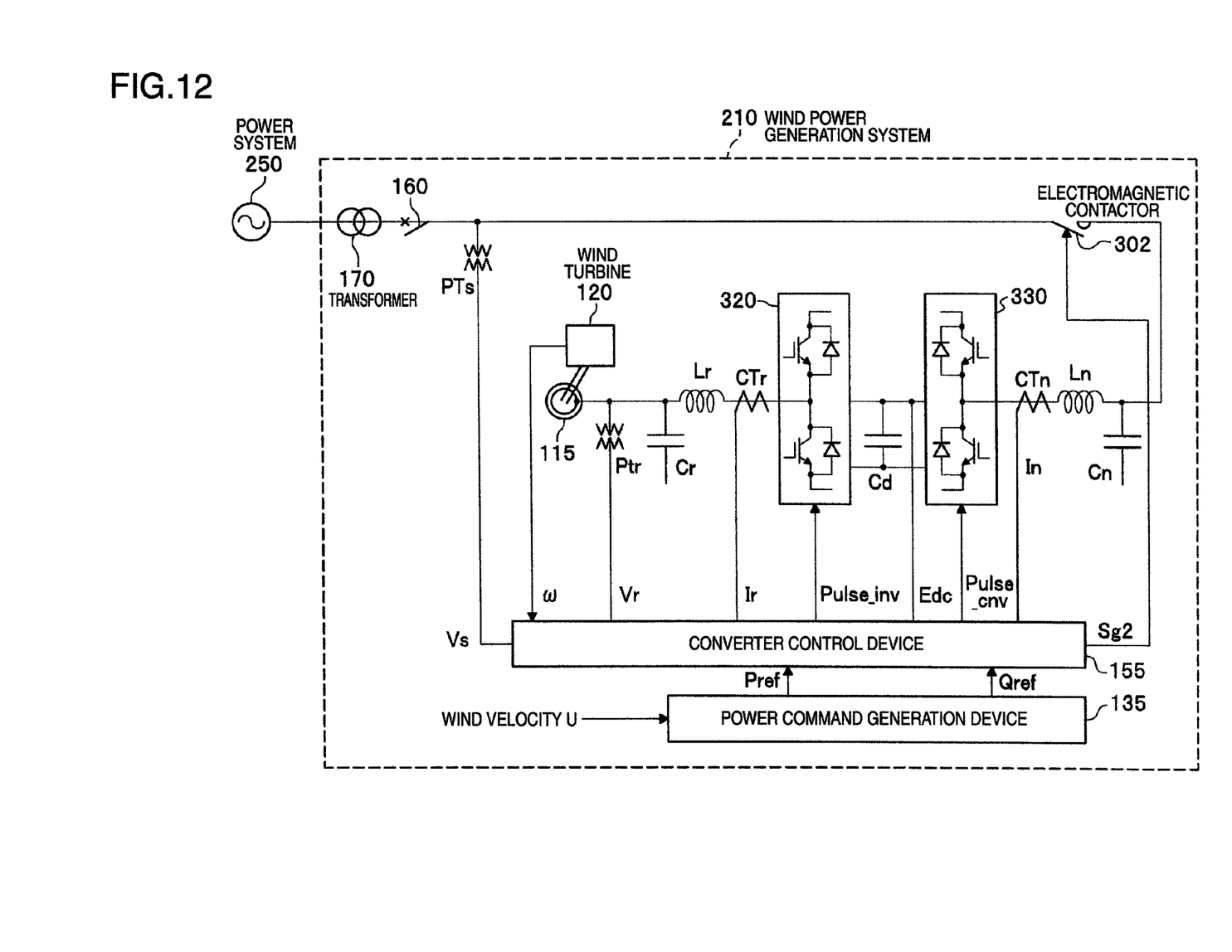
FIG. 12 shows the detailed configuration of the wind power generation system according to another embodiment of the present invention.

In FIG. 12, the wind power generation system 210 includes a generator 115, a wind turbine 120, a power command generation device 135, converters 320 and 330, a converter control device 155, a transformer 170, a breaker 160, a capacitor Cd, capacitors Cr and Cn, reactors Lr and Ln, an electromagnetic contactor 302, voltage sensor PTs and PTg, and current sensors CTr and CTn, and the components are connected to the power system 250.

The power command generation device 135 generates the power commands Pref and Qref from the wind velocity U. The converter control device 155 calculates the active power Ps and the reactive power Qs from the generator voltage Vr and the generator current Ir, and controls the converter 320 on the generator side such that they can match the active power command Pref and the reactive power command Qref respectively. In FIG. 12, the generator 115 is not connected to the power system 250, but it is connected to the power system 250 through the converters 320 and 330, and the converter control device 155 detects the generator voltage Vr, which are quite different from FIG. 2.

Figure 13:
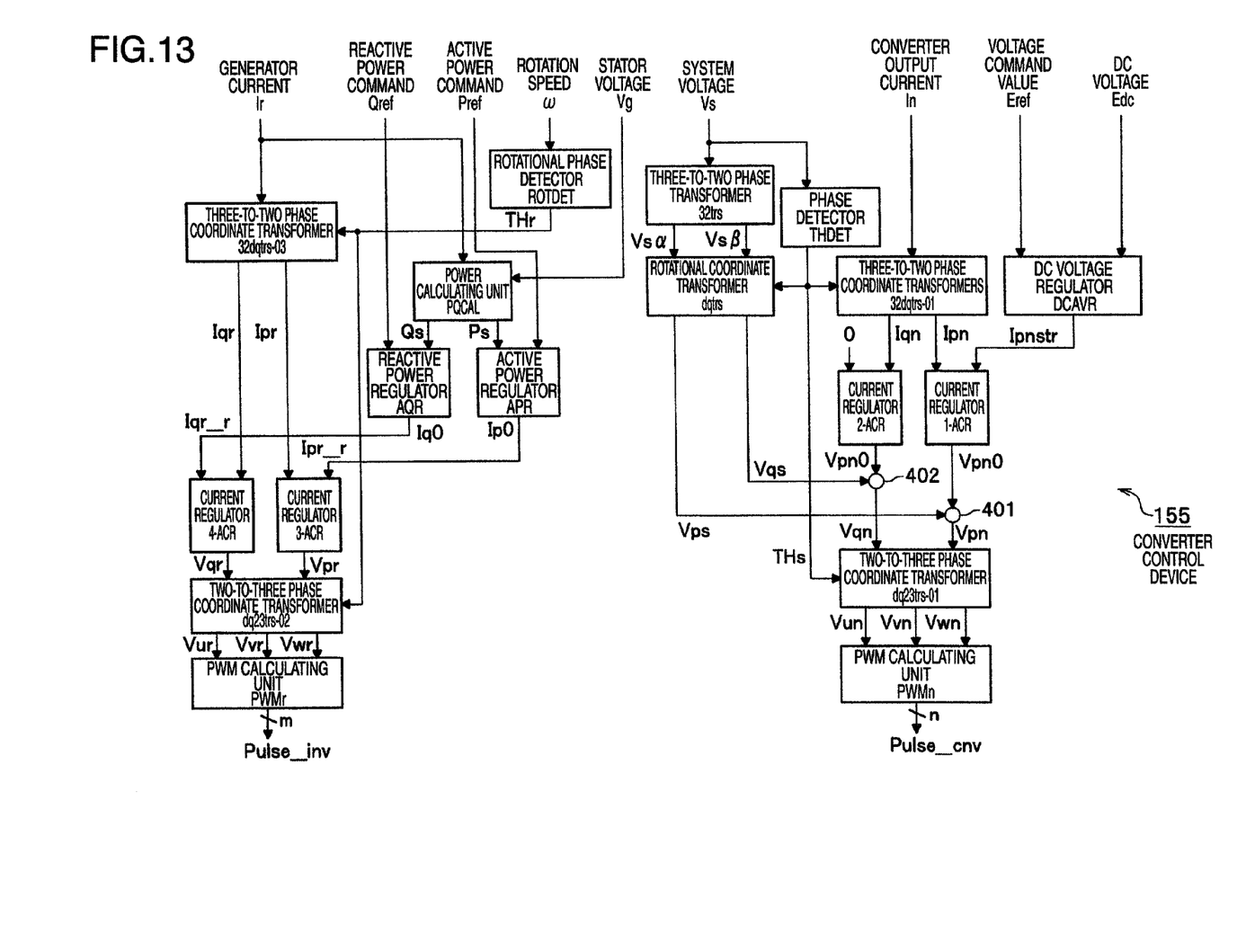
FIG. 13 shows another internal configuration of the converter control device.

In FIG. 13, the converter control device 155 outputs the generator current commands Iqr_r and Ipr_r from the active power command Pref and the reactive power command Qref using the active power regulator APR and the reactive power regulator AQR, calculates the voltage commands Vur, Vvr, and Vwr output the converter 320 such that the p-axis component Ipr and the q-axis component Iqr of the generator current Ir can match the current commands Iqr_r and Ipr_r, and controls the converter 320. Since the converter 330 is similar to that according to the first embodiment, the explanation is omitted here. As in the first embodiment, the PWM modulation system of the converter 330 on the system side is indicated by the equations (13) and (14). Thus, similar effects can be obtained to that of the first and second embodiments.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wind power generation system comprising:
a wind turbine in which at least one blade is mounted on an axis;
a generator for generating multiphase alternating current power by rotation of the axis; and
a power conversion device for performing PWM-control for adjustment and output of generated power of the generator;
wherein the power conversion device performs the PWM-control by providing for each phase a control paused period in which no overlap occurs;
wherein the power conversion device performs the PWM-control by comparing the command value based on a frequency of a connected terminal voltage with a triangular wave; and
wherein the frequency of the triangular wave is 6n (n is a positive integer) times as high as a frequency of the terminal voltage.

2. The wind power generation system according to claim 1, wherein the generator is a permanent magnetic generator;
wherein the power conversion device comprises a first power converter capable of bidirectionally converting AC power and DC power; a capacitor for storing the DC power; and a second power converter capable of bidirectionally converting DC power and AC power; and
wherein a coil side of the permanent magnetic generator is connected to an alternating current side of the first power converter, and an alternating current side of the second power converter is connected to a power system.

3. A wind power generation system comprising:
a wind turbine in which at least one blade is mounted on an axis;
a generator for generating multiphase alternating current power by rotation of the axis;
a power conversion device for performing PWM-control for adjustment and output of generated power of the generator;
wherein the power conversion device performs the PWM-control by providing for each phase a control paused period in which no overlap occurs;
wherein the power conversion device provides the control paused period when a rotation speed of the generator is equal to or less than, or more than a predetermined value; and
wherein the predetermined value is obtained by an amount of heat of a switching element.

4. A wind power generation system comprising:
a wind turbine in which at least one blade is mounted on an axis;
a generator for generating multiphase alternating current power by rotation of the axis; and
a power conversion device for performing PWM-control for adjustment and output of generated power of the generator;
wherein the power conversion device performs the PWM-control by providing for each phase a control paused period in which no overlap occurs;
wherein the generator is a synchronous generator;
wherein the power conversion device comprises a first power converter capable of bidirectionally converting AC power and DC power, a capacitor for storing the DC power; and a second power converter capable of bidirectionally converting DC power and AC power; and
wherein a stator side of the synchronous generator is connected to an alternating current side of the first power converter, an alternating current side of the second power converter is connected to a power system, and the period is determined by a system frequency of the power system.

* * * * *